(12) United States Patent
Wakuda

(10) Patent No.: US 12,724,489 B2
(45) Date of Patent: Sep. 1, 2026

(54) STYLUS PEN AND INPUT SYSTEM

(71) Applicant: ALPS ALPINE CO., LTD., Tokyo (JP)

(72) Inventor: Hiroshi Wakuda, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 19/220,607

(22) Filed: May 28, 2025

(65) Prior Publication Data

US 2025/0284342 A1 Sep. 11, 2025

Related U.S. Application Data

(63) Continuation of application No. PCT/JP2023/036509, filed on Oct. 6, 2023.

(30) Foreign Application Priority Data

Dec. 12, 2022 (JP) ................................ 2022-197695

(51) Int. Cl.

*G06F 3/01* (2006.01)
*G06F 3/0354* (2013.01)
*G06F 3/038* (2013.01)

(52) U.S. Cl.

CPC .......... *G06F 3/016* (2013.01); *G06F 3/03545* (2013.01); *G06F 3/0383* (2013.01)

(58) Field of Classification Search

CPC ........... G02F 1/13452; G02F 1/136213; G02F 1/136286; G09G 3/3611; G09G 3/3648; G09G 3/3677; G09G 3/3688; G09G 2300/0426; G09G 2300/0876; G09G 2320/0204; G09G 2320/0247; H01L 27/124; H01L 27/1255

See application file for complete search history.

(56) References Cited

U.S. PATENT DOCUMENTS

2009/0135164 A1 5/2009 Kyung et al.
2011/0032090 A1* 2/2011 Provancher ......... G06F 3/03545 340/407.1
2013/0321348 A1* 12/2013 Takahama ............... G06F 3/038 345/177
2014/0168124 A1 6/2014 Park et al.
2019/0094974 A1 3/2019 Hayashi

FOREIGN PATENT DOCUMENTS

JP H09-190271 7/1997
JP 2009-238081 10/2009
JP 2014-063443 4/2014
JP 2019-066960 4/2019

OTHER PUBLICATIONS

International Search Report for PCT/JP2023/036509 mailed on Nov. 14, 2023.

* cited by examiner

*Primary Examiner* — Nelson M Rosario
(74) *Attorney, Agent, or Firm* — IPUSA, PLLC

(57) ABSTRACT

A stylus pen includes: a pen part; a vibrator provided in the pen part; and a controller configured to generate a drive signal for driving the vibrator. The controller is configured to generate the drive signal such that the vibrator, when driven by the drive signal, causes the pen part to vibrate based on an impulse response of a spring-mass-damper system.

15 Claims, 13 Drawing Sheets correlation coef.avg=0.93775
std=0.0207782
x−axis acceleration wave form (avg.)
ACCELERATION OF VIBRATION
accel. [G]
6
4
2
0
−2
−4
−6
0
0.002
0.004
0.006
0.008
0.01
0.012
0.014
0.016
0.018
time [sec]

correlation coef.avg=0.81049
std=0.091871
y-axis acceleration wave form (avg.)
ACCELERATION OF VIBRATION
accel. [G]
-0.5
-1
-1.5
-2
-2.5
-3
0
0.002
0.004
0.006
0.008
0.01
0.012
0.014
0.016
0.018
time [sec]

ACCELERATION OF VIBRATION
pen-axis acceleration(centor): group1
EVALUATION PERIOD
accel. [G]
time [sec]
PEN'S WRITING ANGULAR VELOCITY
pen-axis angle velocity(centor): group1
angle vel. [deg/sec]
time [sec]
PEN'S WRITING PRESSURE
Load force(centor): group1
force [N]
time [sec]

BEHAVIOR OF VIBRATION'S ACCELERATION IN TIME DOMAIN
accel. [G]
2.5
2
1.5
1
0.5
0
0.005
0.01
0.015
0.02
time [sec]
ARMA (prony)
BEHAVIOR OF VIBRATION'S ACCELERATION IN FREQUENCY DOMAIN
accel. [G: dB]
60
40
20
0
−20
−40
$10^1$
$10^2$
$10^3$
freq [Hz]

FIG.4C
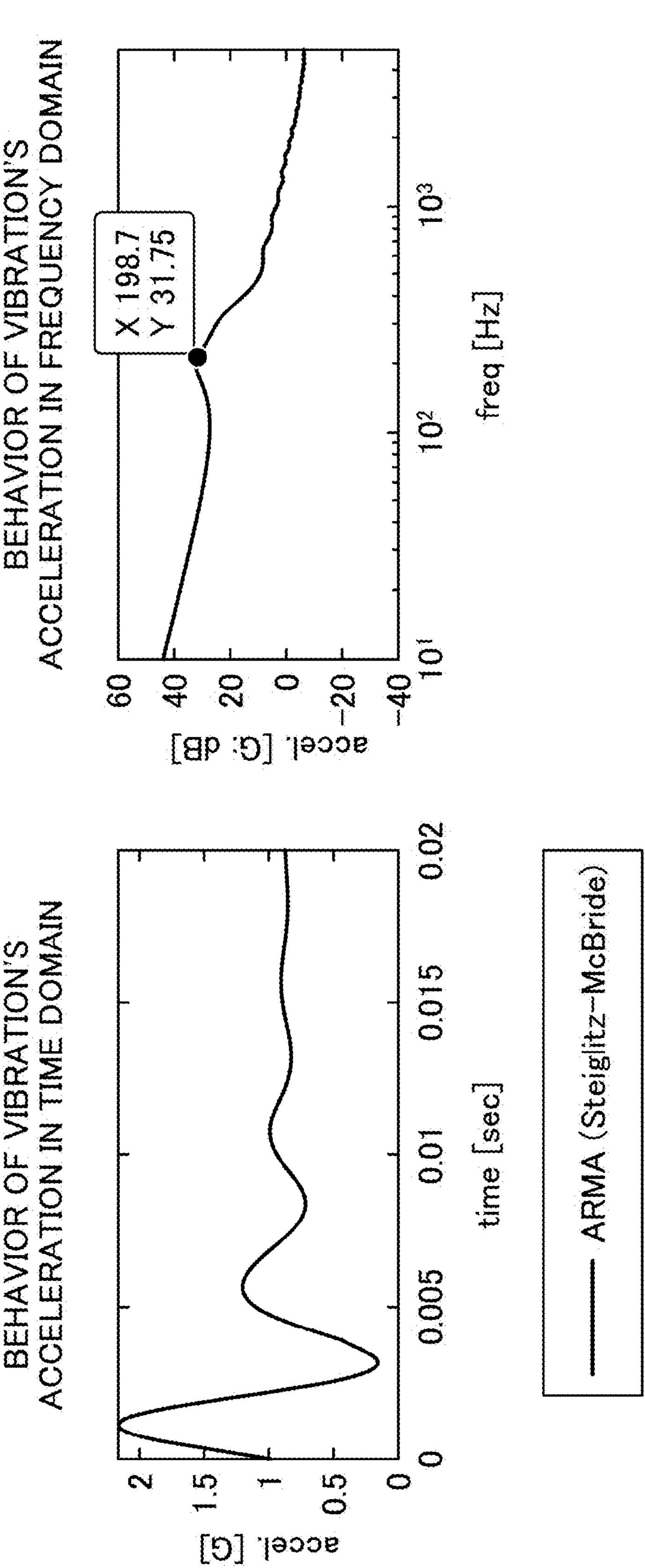

120
WRITING PRESSURE SENOR
110
GYROSENSOR
130
131
DATA INPUT PART
132
WAVEFORM GENERATOR
133
WAVEFORM OUTPUT PART
134
MEMORY
140
DRIVER
150
VIBRATOR

STYLUS PEN AND INPUT SYSTEM

CROSS-REFERENCE TO RELATED APPLICATIONS

This application is a continuation application of International Application No. PCT/JP2023/036509, filed on Oct. 6, 2023, and designated in the U.S., which is based upon and claims priority to Japanese Patent Application No. 2022-197695, filed on Dec. 12, 2022. The entire contents of these applications are incorporated herein by reference.

BACKGROUND OF THE INVENTION

1. Field of the Invention

The present disclosure relates to a stylus pen and an input system.

2. Description of the Related Art

An existing vibration system includes, for example, a linear vibration motor and a controller that controls the drive current waveform of the vibration motor. The drive current waveform is composed of large unit waves that are identical to each other and arranged in a consecutive manner in the time domain. Each large unit wave has: a first region having a waveform with a low amplitude in one period T, which is the width of the large unit wave in the time domain; and a second region having a waveform with a larger amplitude than the first region. The first region and the second region appear alternately in the time domain. The vibration system produces vibrations in a stylus pen (see, for example, patent document 1).

CITATION LIST

Patent Document

[Patent Document 1] Unexamined Japanese Patent Application Publication No. 2019-066960

SUMMARY OF THE INVENTION

Now, assuming that the above vibration system is incorporated in a stylus pen, the vibration system does not drive the vibration motor (vibrator) based on vibrations that transmit to the user's hand while the user is really writing with the stylus pen (that is, does not rely on vibrations produced when the user writes or draws something on a sheet of paper with an ink ballpoint pen), but drives the vibration motor simply in vibration patterns that mimic the vibrations that are produced while writing is in progress. A stylus pen incorporating the above vibration system therefore has difficulty providing a realistic tactile experience that feels as if really writing with a pen.

The present disclosure therefore aims to provide a stylus pen and an input system that can provide a realistic tactile experience that feels as if really writing with a pen.

According to an embodiment of the present disclosure, a stylus pen includes: a pen part; a vibrator provided in the pen part; and a controller configured to generate a drive signal for driving the vibrator. The controller is configured to generate the drive signal such that the vibrator, when driven by the drive signal, causes the pen part to vibrate based on an impulse response of a spring-mass-damper system.

According to an embodiment of the present disclosure, an input system includes: a stylus pen; a detector configured to detect contact of the stylus pen with an operation surface; a vibrator; and a controller configured to generate a drive signal for driving the vibrator. The controller is configured to generate the drive signal such that the vibrator, when driven by the drive signal, causes the stylus pen to vibrate based on an impulse response of a spring-mass-damper system.

It is thus possible to provide a stylus pen and an input system that can provide a realistic tactile experience that feels as if really writing with a pen.

BRIEF DESCRIPTION OF THE DRAWINGS

FIG. 4C is a diagram showing examples of how vibration's acceleration behaves in the time domain and the frequency domain, estimated based on an ARMA (Steiglitz-Mcbride) model;

DETAILED DESCRIPTION OF THE PREFERRED EMBODIMENTS

A stylus pen and an input system according to an embodiment of the present disclosure will be described below.

The XYZ coordinate system will be used in the following description. Directions that run parallel to the X axis (±X directions), directions that run parallel to the Y axis (±Y directions), and directions that run parallel to the Z axis (±Z directions) are orthogonal to each other. Also, in the following description and the accompanying drawings, the −Z direction may be referred to as the "lower side", "bottom", etc. and the +Z direction may be referred to as the "upper side", "top", etc. for ease of explanation. Nevertheless, these terms do not necessarily represent the common idea of up and down. Also, "plan view" as used herein refers to a view on an XY plane.

In the following description, the length, width, thickness, etc. of each component/part may be exaggerated to make the structure(s) easier to understand. In addition, terms such as "parallel", "up", "down", etc. as used herein may allow inaccuracies insofar as they do not impair the advantages the present disclosure brings about.

Embodiment

Figure 1A:
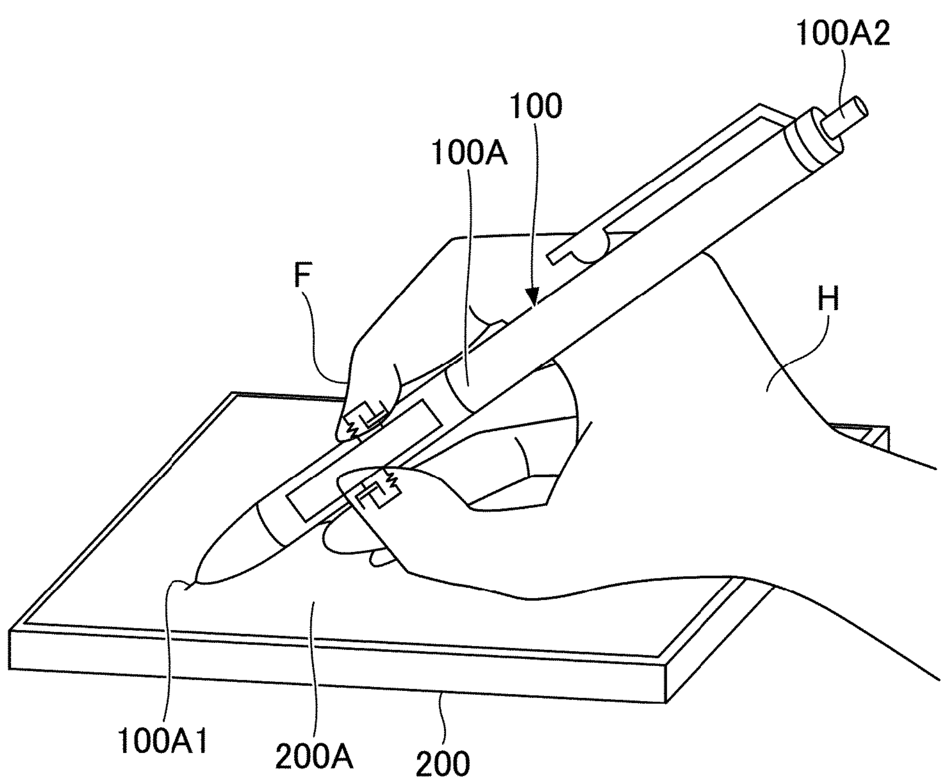
FIG. 1A is a diagram showing an example state in which a stylus pen according to an embodiment of the present disclosure is used.

FIG. 1A is a diagram showing an example state in which a stylus pen 100 according to an embodiment of the present disclosure is used. FIG. 1A shows a tablet computer 200 that can be operated using the stylus pen 100. The tablet computer 200 has an operation surface 200A. In one example, the operation surface 200A is a top-panel surface placed on top of an LCD display. An electrostatic sensor that can detect the coordinates of positions on the operation surface 200A where operations are made may be provided between the LCD display and the top panel.

A user holds the stylus pen 100 in his/her hand H, and operates the tablet computer 200 by touching the operation surface 200A of the tablet computer 200 with the tip of the stylus pen 100.

The stylus pen 100 has a pen part 100A. The pen part 100A is the part of the stylus pen 100 that can be seen from outside, and includes a tip 100A1, a cap 100A2, etc. The stylus pen 100 includes, inside the pen part 100A, a vibrator, a driver, a controller, a gyrosensor, a writing-pressure sensor, a battery, etc., but these are omitted in FIG. 1A.

Assuming that the system from the stylus pen 100 to the user's hand H can be represented as a mechanical model, a mechanical model that has a spring and a damper between fingers F of the user's hand H and the pen part 100A and that is therefore elastic, that is, a mass-spring-damper system, may be provided.

Figure 1B:
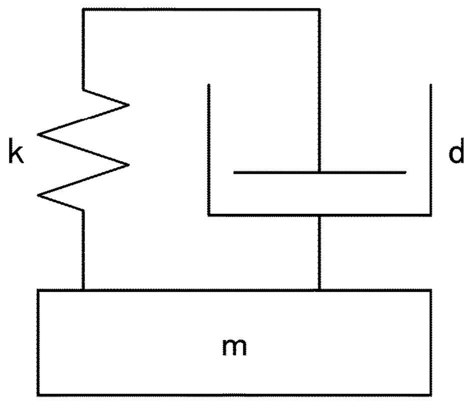
FIG. 1B is a diagram showing an example mechanical model combining fingers and a pen.

FIG. 1B is a diagram showing an example mechanical model combining fingers F and the pen part 100A. As shown in FIG. 1B, the mechanical model of fingers F and the pen part 100A can be represented as a mass-spring-damper system including an object with a mass "m" (kg), a spring with a spring constant "k" (N/m), and a damper with a viscous resistance "d" (N/sec/m). The mass m is an equivalent mass of the stylus pen 100 and fingers F.

In the following description, the tip 100A1 of the pen part 100A will be described as one that is very hard, like that of a ballpoint pen. In the event the tip 100A1 of the pen part 100A is less hard like that of a felt-tip pen, a fountain pen, or a writing brush, a spring and a damper must be provided at the tip 100A1; this provides, for example, a mechanical model in which two mechanical models such as the one shown in FIG. 1B are connected in series. The waveform of an impulse response in a mass-spring-damper system mechanical model does not change even if the pen's writing speed or load changes. In other words, when a pulse with an infinitesimal time-width and infinite displacement (i.e., impulse) is input to the mass-spring-damper system mechanical model, the waveform of the response in the time domain does not change even if the pen's writing speed or load changes.

<Measurement of Vibration Waveform>

Figure 2A:
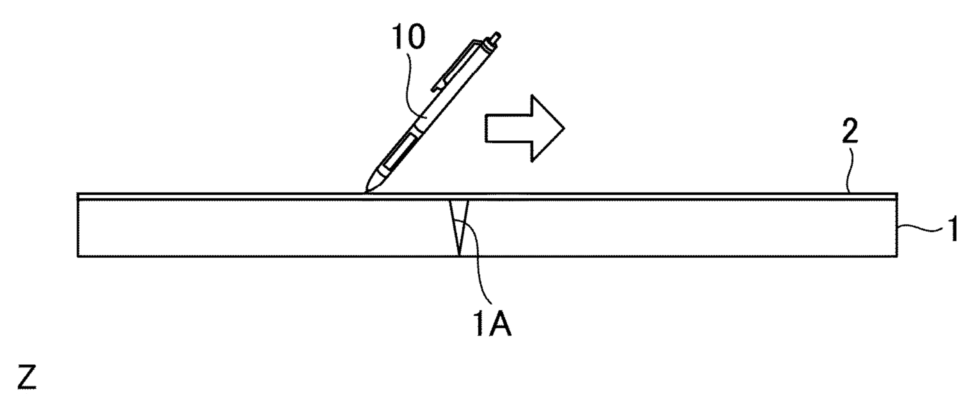
FIG. 2A is a diagram showing an example of how to measure a vibration waveform.

FIG. 2A shows an example of how to measure a vibration waveform. As shown in FIG. 2A, a sheet of paper 2 (hereinafter simply "sheet") is placed on the upper surface of a flat plate 1 having an uneven part 1A on its upper surface, and the tip of a ballpoint pen 10 is brought into contact with the surface of the sheet 2. In this state, the person who takes measurements draws a straight line in the X-axis direction with the ballpoint pen 10, and measures the waveform of vibrations produced then in the ballpoint pen 10.

The rate of acceleration of vibrations produced in the ballpoint pen 10 changes over time while writing is in progress, and is measured as a vibration waveform. That is, the vibration waveform that occurs in the ballpoint pen 10 while writing is in progress can be represented as changes in the rate of acceleration of vibrations produced in the ballpoint pen 10 over time while writing is in progress.

An acceleration sensor is attached to the tip of the ballpoint pen 10, and the rate of acceleration of vibrations produced in the ballpoint pen 10 while writing is in progress is measured using the acceleration sensor, thereby measuring the waveform of vibrations. Note that drawing a diagram or the like with the ballpoint pen 10 is the same as writing. The same is true for a stylus pen.

Figure 2B:
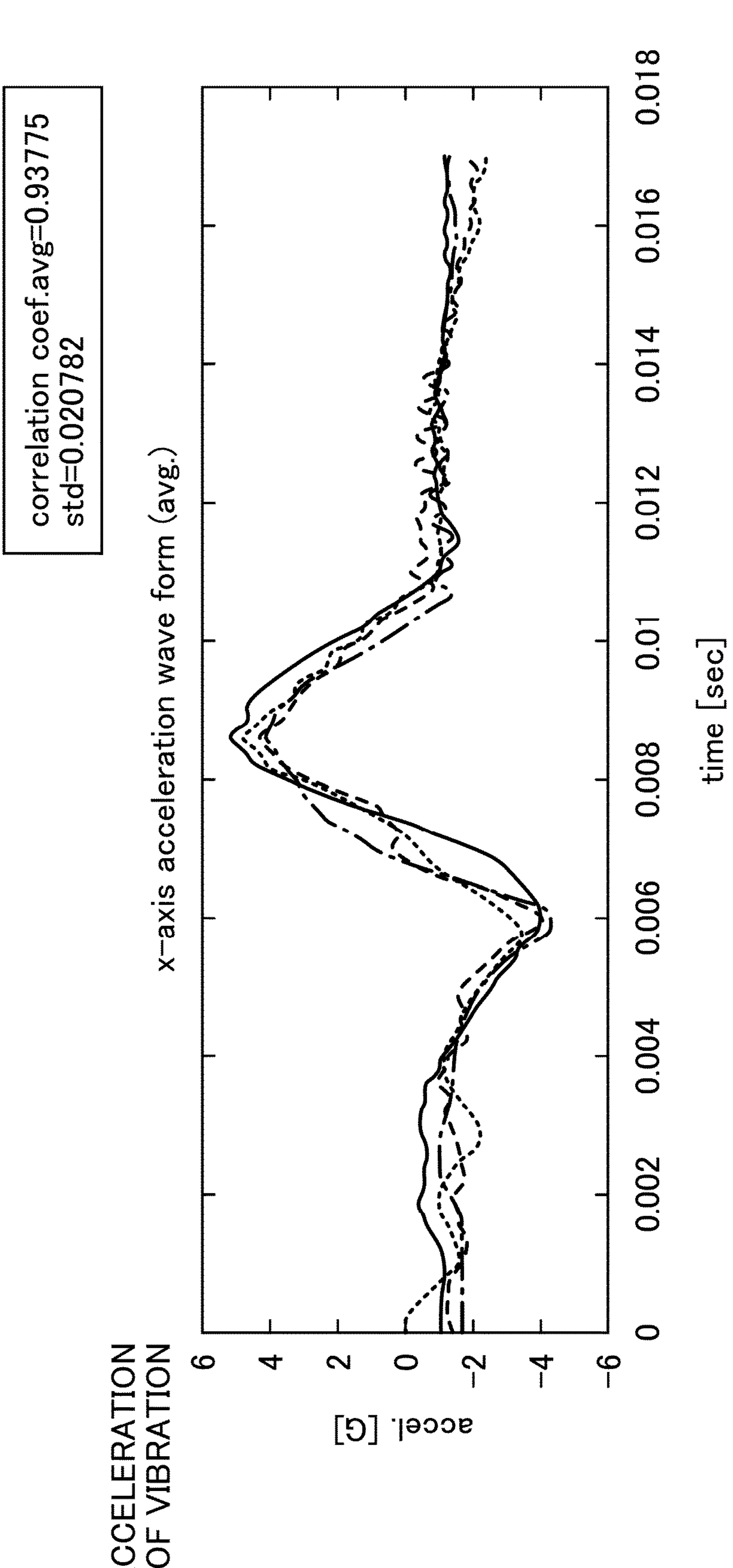
FIG. 2B is a diagram showing an example result of measuring vibration waveforms representing vibrations produced in a ballpoint pen by the act of writing.
Figure 2C:
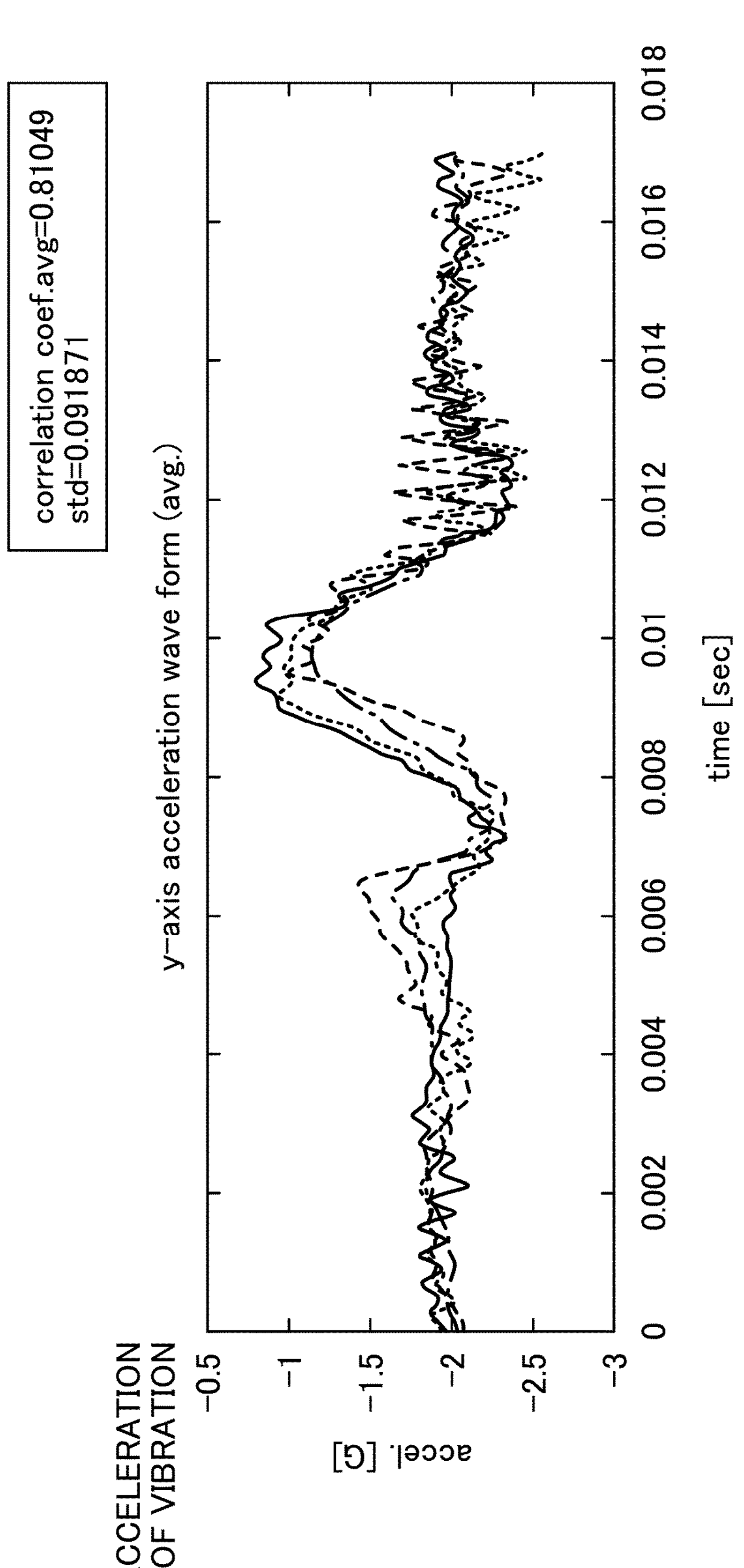
FIG. 2C is a diagram showing an example result of measuring vibration waveforms representing vibrations produced in a ballpoint pen by the act of writing.

FIG. 2B and FIG. 2C are diagrams that each show example results of measuring vibration waveforms representing the vibrations produced in the ballpoint pen 10 by the act of writing, and the multiple lines show normalized results obtained by changing the writing speed, load, etc. of the ballpoint pen 10. In FIG. 2B and FIG. 2C, the horizontal axis is time (seconds or "[sec]") and the vertical axis is the rate of acceleration of vibration (G). FIG. 2B shows the rate of acceleration in the X direction, and FIG. 2C shows the rate of acceleration in the Y direction. The X direction is a direction in which the ballpoint pen 10 draws a straight line.

As shown in FIG. 2B and FIG. 2C, the rate of acceleration of the ballpoint pen 10 shows a pulse-like surge from approximately 0.008 seconds to 0.011 seconds, from the beginning, when the tip of the ballpoint pen 10 passes over the uneven part 1A, and the shape of the vibration waveform in the time domain stays approximately the same even if the writing speed of the ballpoint pen 10 changes. This shows that the vibration of the ballpoint pen 10 and the impulse response of the mass-spring-damper system mechanical model are alike, and that the shape of the vibration waveform in the time domain stays unchanged even when the writing speed of the ballpoint pen 10 changes. The same is likely to hold true for a stylus pen with a very hard tip 100A1. Furthermore, the same is likely to hold true for felt-tip pens, fountain pens, or writing brushes with less hard tips. The constants in the mass-spring-damper system mechanical model are likely to vary for every one of these writing instruments; it then follows that each of these writing instruments gives a vibration waveform having a shape that is determined by the frequency of vibration, which is unique to each writing instrument.

<Internal Model Estimation to Achieve Impulse Response>

Figure 3:
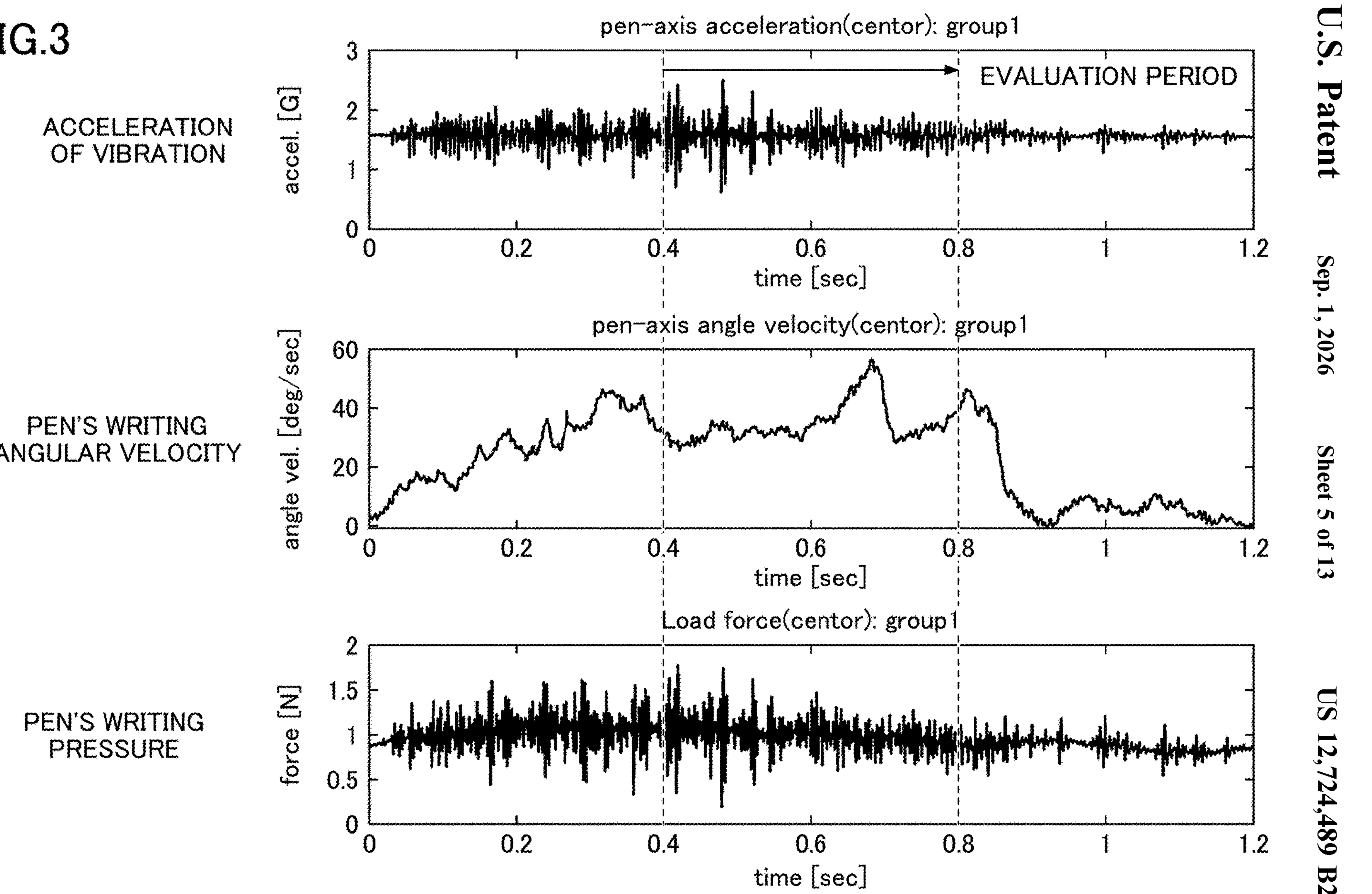
FIG. 3 is a diagram showing example results of measuring the rate of acceleration, writing angular velocity, and writing pressure that are produced in a ballpoint pen and change over time.

FIG. 3 is a diagram showing example results of measuring changes in the rate of acceleration, writing angular velocity, and writing pressure that the ballpoint pen 10 undergoes when drawing a straight line on a normal sheet of paper with few uneven parts. The rate of acceleration, writing angular velocity, and writing pressure shown in FIG. 3 are actual measured values. The writing angular velocity of the ballpoint pen 10 is an example of its writing speed.

"The rate of acceleration" as used herein refers to the rate of acceleration of the vibration of the ballpoint pen 10 when writing with the ballpoint pen 10, and the vibration waveform is measured by using an acceleration sensor attached to the tip of the ballpoint pen 10. The pen's "writing angular velocity" as used herein refers to the angular velocity that is produced in the ballpoint pen 10 when writing with the ballpoint pen 10, and is measured by a gyrosensor attached to the ballpoint pen 10. It is preferable to place the gyrosensor in a position where it does not come into contact with the user's hand holding the ballpoint pen 10. In the present example, the gyrosensor is attached to the cap end of the ballpoint pen 10.

The pen's "writing pressure" as used herein refers to the force with which the tip of the ballpoint pen 10 is pressed against the sheet 2 while writing is in progress, and is measured in a state in which the flat plate 1 is mounted over a load cell (load sensor).

Based on the measured values of rates of acceleration, writing angular velocity, and writing pressure of the ballpoint pen 10, an impulse response of the stylus pen 100, that is, an internal model with a time-domain waveform that is unaffected by changes in the pen's writing angular velocity and writing pressure, is estimated. In FIG. 3, the pen starts off still at 0 seconds and writes linearly for 1.2 seconds; the results are as illustrated. In this example, model estimation is performed using the accelerating period from 0.4 seconds to 0.8 seconds, in which the pen's writing angular velocity peaks, as an evaluation period.

In this model estimation, the force that acts between the sheet 2 and the ballpoint pen 10 and that varies over time while writing is in progress is used as an input, and the varying force's median is set to 0. In addition, the rate of acceleration of the ballpoint pen 10 while writing is in progress is the output of the present model estimation. In the present model estimation, the parameters of the spring and damper in the mechanical model of the ballpoint pen 10 and fingers F are fixed values that do not change while writing is in progress.

Internal model estimation is performed using an auto regressive (AR) model or auto regressive moving average (ARMA) models. To be more specific, an AR model, an ARMA (Prony) model and an ARMA (Steiglitz-Mcbride) model are adjusted such that an input-output relationship fits each model.

Figure 4A:
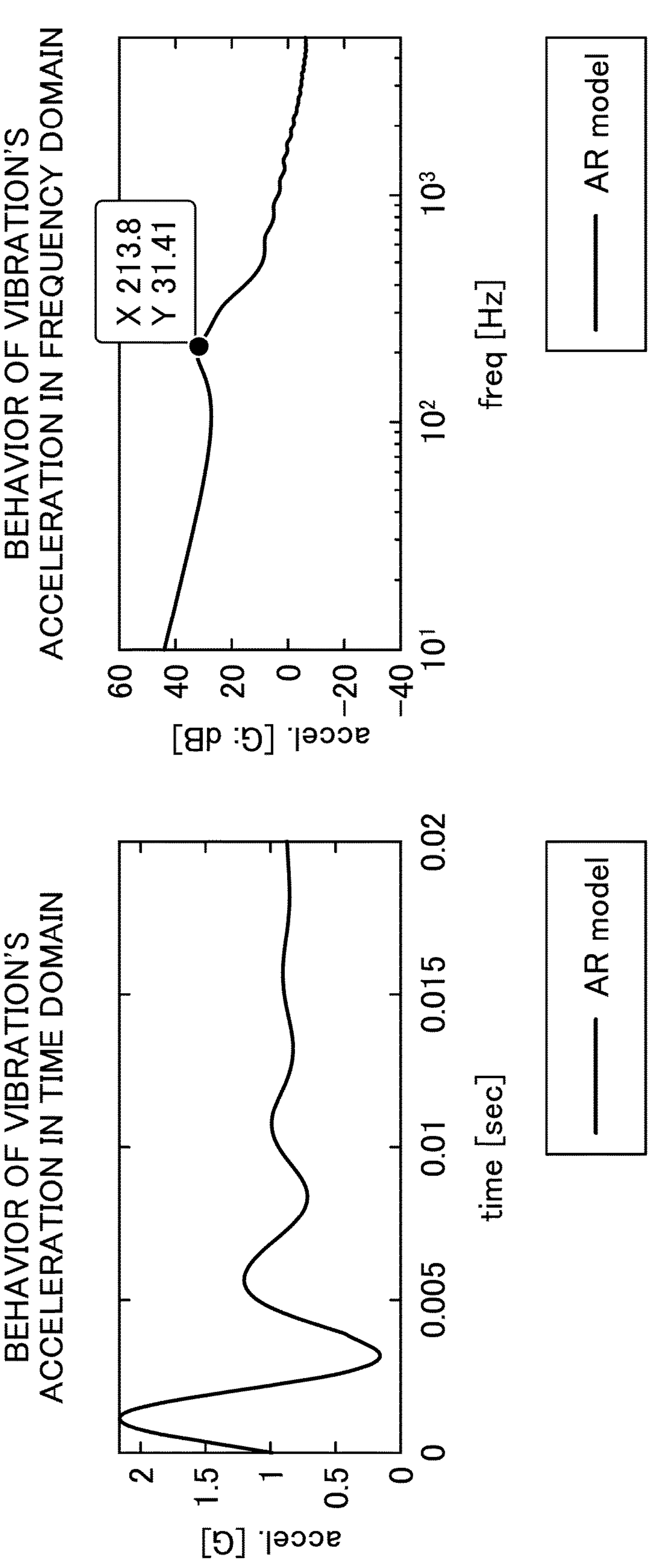
FIG. 4A is a diagram showing examples of how an internal model's rate of acceleration behaves in the time domain and the frequency domain, estimated based on an AR model.
Figure 4B:
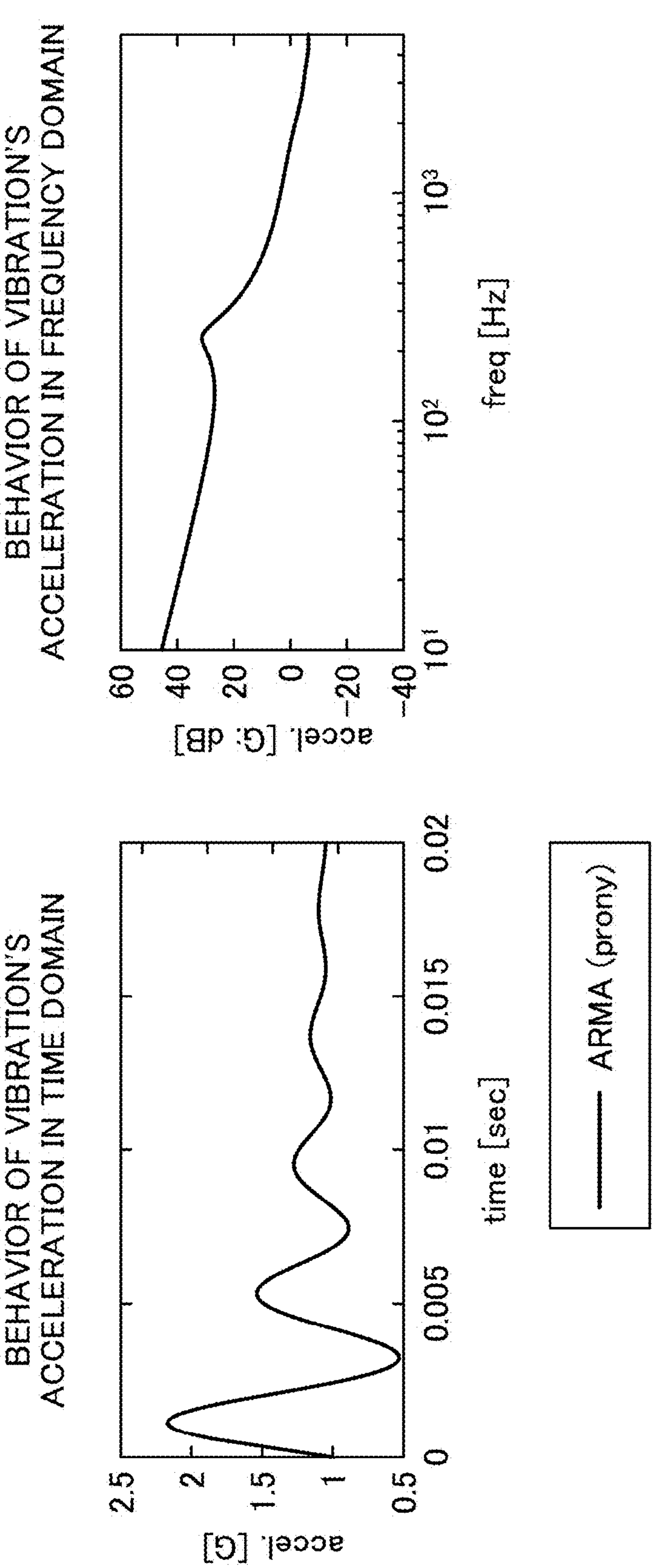
FIG. 4B is a diagram showing examples of how an internal model's rate of acceleration behaves in the time domain and the frequency domain, estimated based on an ARMA (Prony) model.

FIG. 4A is a diagram showing examples of how an internal model's rate of acceleration behaves in the time domain and the frequency domain, estimated based on the AR model. FIG. 4B is a diagram showing examples of how an internal model's rate of acceleration behaves in the time domain and the frequency domain, estimated based on the ARMA (Prony) model. FIG. 4C is a diagram showing examples of how an internal model's rate of acceleration behaves in the time domain and the frequency domain, estimated based on the ARMA (Steiglitz-Mcbride) model. Note that each illustrated behavior in the frequency domain is a result of calculating the behavior of frequency response from the system's behavior determined by internal model estimation.

Referring to the rates of acceleration of vibration in the time domain shown in FIG. 4A to FIG. 4C, the way vibration behaves does not differ substantially among the AR model, the ARMA (Prony) model, and the ARMA (Steiglitz-Mcbride) model, assuring that the rate of vibration's acceleration in the time domain can be estimated reliably. Comparing the results of estimating what behavior the rate acceleration exhibits in the time domain from the vibrations produced while writing is in progress based on the AR model, the ARMA (Prony) model, and the ARMA (Steiglitz-Mcbride) model with the result of taking measurements based on the method shown in FIG. 2A, or, to be more specific, comparing the rates of acceleration of vibration shown in FIG. 4A, FIG. 4B, and FIG. 4C with those shown of FIG. 2B and FIG. 2C, makes it clear that the time response (waveform in the time domain) is roughly the same whatever measurement/estimation method is used. These results assure that internal models obtained by a variety of internal model estimation methods such as the AR model can be used to estimate the vibration waveform of the ballpoint pen 10 while writing is in progress.

Furthermore, the rates of acceleration of vibration in the frequency domain illustrated in FIG. 4A to FIG. 4C all show that the vibration decelerates as the frequency increases. From this, it is confirmed that the system including the ballpoint pen 10 and fingers F can be represented by a mechanical model such as that shown in FIG. 1B.

Furthermore, the rates of acceleration of vibration in the frequency domain shown in FIG. 4A to FIG. 4C have one peak near 206 Hz, thus having one resonant frequency in a confirmable manner. The fact that the above behaviors of vibration's acceleration in the frequency domain have one peak indicates that the mechanical model of the system from the stylus pen 100 to the user's hand H shown in FIG. 1A provides one resonant system. This indicates that the mechanical model of the system including the ballpoint pen 10 and fingers F can be represented by a single mechanical model such as the one shown in FIG. 1B.

Provided that some writing instruments have a tip that is not hard, such as felt-tip pens, fountain pens, or writing brushes, a system combining a felt-tip pen, a fountain pen, or a writing brush with fingers F is a mechanical model in which at least two mechanical models such as the one shown in FIG. 1B are connected in series, so that there will be at least two resonant frequencies. It then follows that the rates of acceleration of vibration in the frequency domain shown in FIG. 4A to FIG. 4C should have at least two peaks.

Figure 5A:
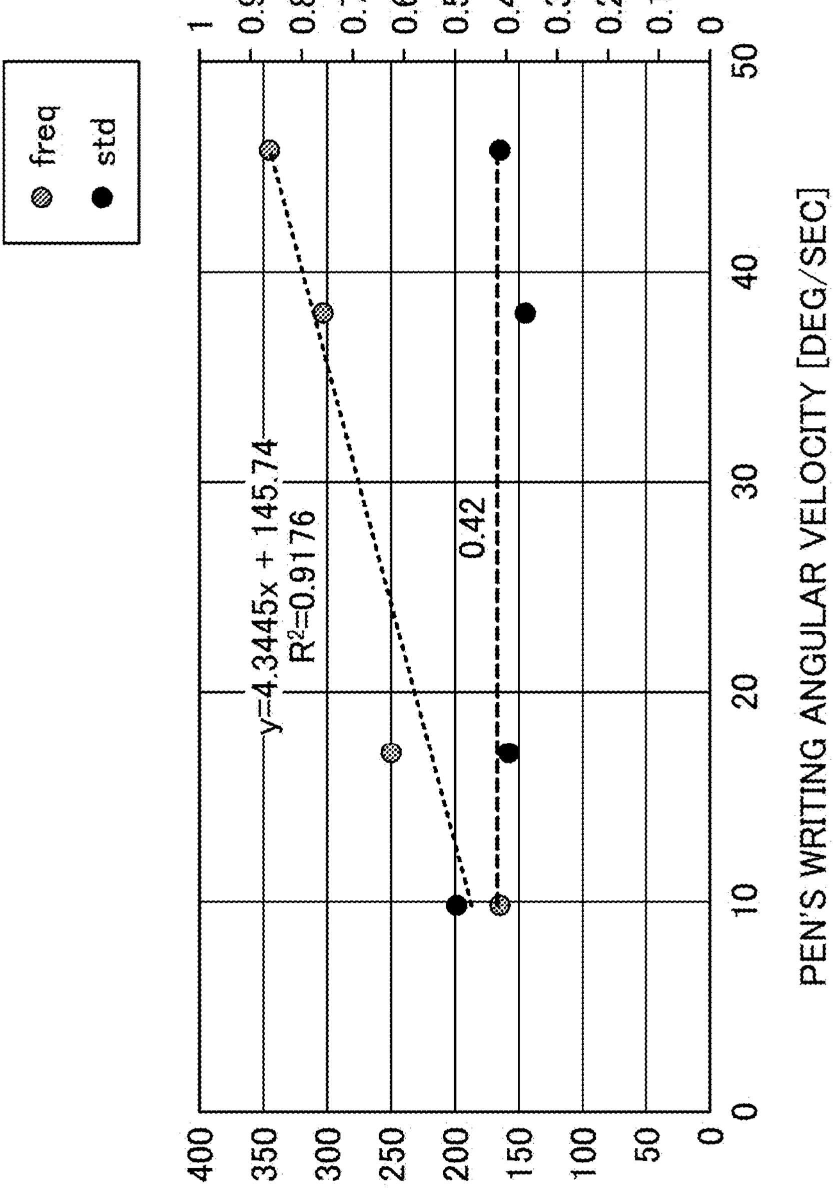
FIG. 5A is a diagram showing examples of how the average frequency and normalized standard deviation of vibrations behave with respect to the pen's writing angular velocity.

FIG. 5A is a diagram showing examples of how the average frequency and normalized standard deviation behave with respect to the pen's writing angular velocity. The behaviors of the average frequency and normalized standard deviation versus the pen's writing angular velocity shown in FIG. 5A are determined from the actual measurement values of the pen's writing angular velocity shown in FIG. 3.

A "frequency" in this example is determined by converting the interval between adjacent pulses into a frequency. Assuming that time is divided every 100 milliseconds, the average frequency is, for example, the average value of frequencies occurring in each divided period. The normalized standard deviation is one of average frequencies. Also, for example, the behavior of the average frequency and normalized standard deviation versus the pen's writing angular velocity shown in FIG. 5A is determined from the actual measurement value of the pen's writing angular velocity in the period from 0 seconds to 0.4 seconds in FIG. 3.

As shown in FIG. 5A, the average frequency tends to increase as the pen's writing angular velocity increases. That is, the greater the pen's writing angular velocity, the higher the average frequency tends to be, that is, the interval between adjacent pulses tends to become narrower. To be more specific, when the pen's writing angular velocity is 10 degrees per second, the average frequency is approximately 166 Hz. Likewise, when the pen's writing angular velocity is 45.8 degrees per second, the average frequency is approximately 345 Hz. In other words, the average frequency increases approximately linearly following the dashed line. The increase of the average frequency indicates that the pulses of the waveform in the time domain do not change, and that the time interval at which pulses occur becomes shorter.

Furthermore, as shown in FIG. 5A, the normalized standard deviation of average frequencies remains substantially constant at approximately 0.42 even when the pen's writing angular velocity increases.

This shows the tendency in which, when the pen's writing angular velocity increases, pulses occur at shorter intervals, and the average frequency increases accordingly. When every interval between pulses is converted into a frequency, the resulting frequencies vary in a range of approximately ±40 Hz to ±80 Hz from the average frequency. Consequently, the drive signal has only to be generated such that the time interval between pulses becomes shorter in response to an increase in the pen's writing angular velocity, without changing the waveform of pulses in the time domain.

Figure 5B:
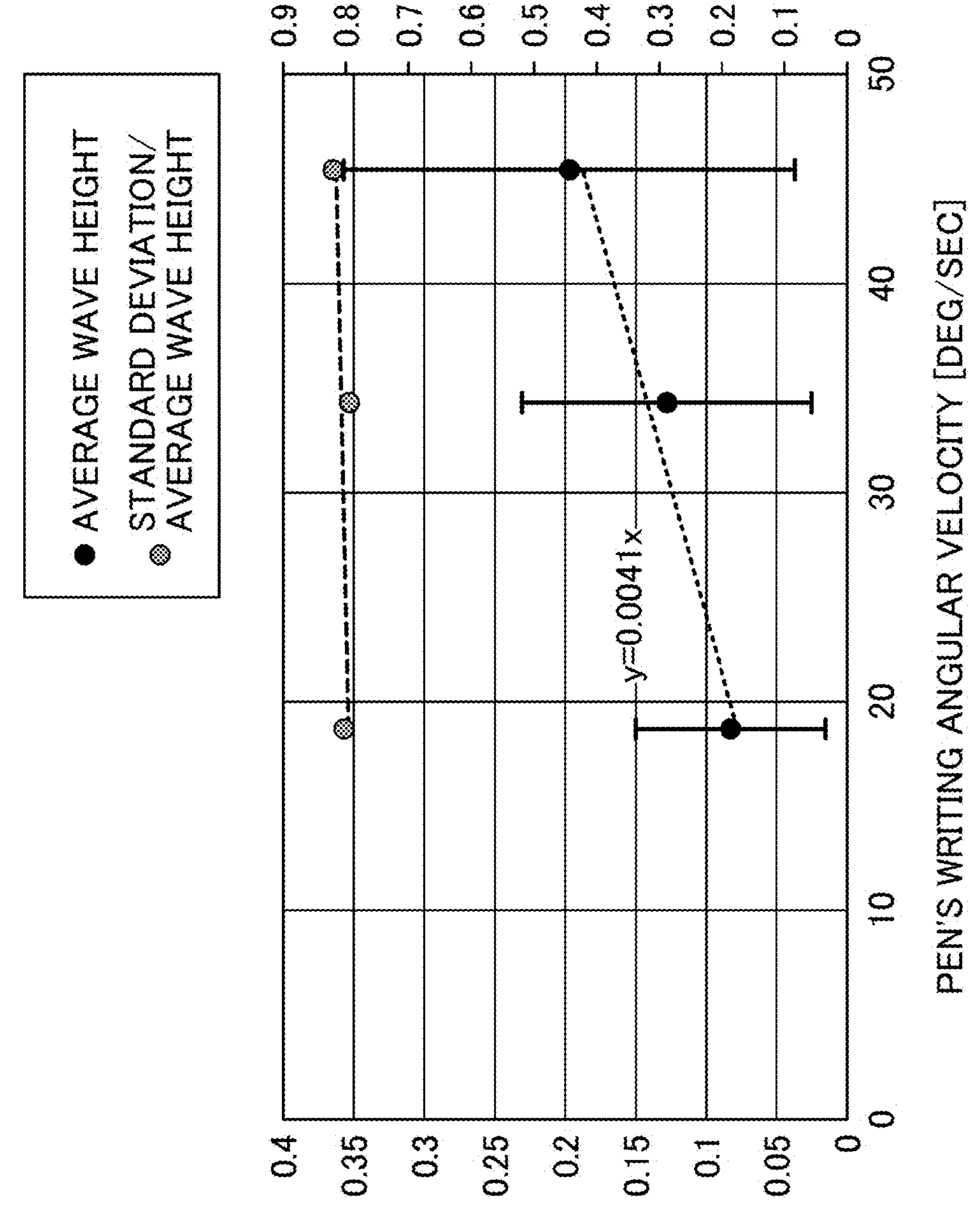
FIG. 5B is a diagram showing examples of how the average wave height of vibration's acceleration and the ratio "standard deviation/average wave height" behave with respect to the pen's writing angular velocity.

FIG. 5B is a diagram showing examples of how the average wave height of vibration's acceleration and the ratio "standard deviation/average wave height" behave with respect to the pen's writing angular velocity. Where the average wave height of vibration's acceleration is determined from the actual measurement values of vibration's acceleration and the pen's writing angular velocity in FIG. 3, FIG. 5B shows how the average wave height of vibration's acceleration and the ratio "standard deviation/average wave height" behave with respect to the pen's writing angular velocity. Note that "wave height" as used herein refers to the amplitude of vibration's acceleration; the unit of measurement for the average wave height is "G." Assuming that time is divided every 100 milliseconds, the average wave height of vibration's acceleration is, for example, the average value of the wave heights of vibration's acceleration in each divided period. The standard deviation here is one of average wave heights of vibration's acceleration. The ratio "standard deviation/average wave height" is determined by dividing the standard deviation of average wave heights of vibration's acceleration by the average wave height of vibration's acceleration.

Figure 5C:
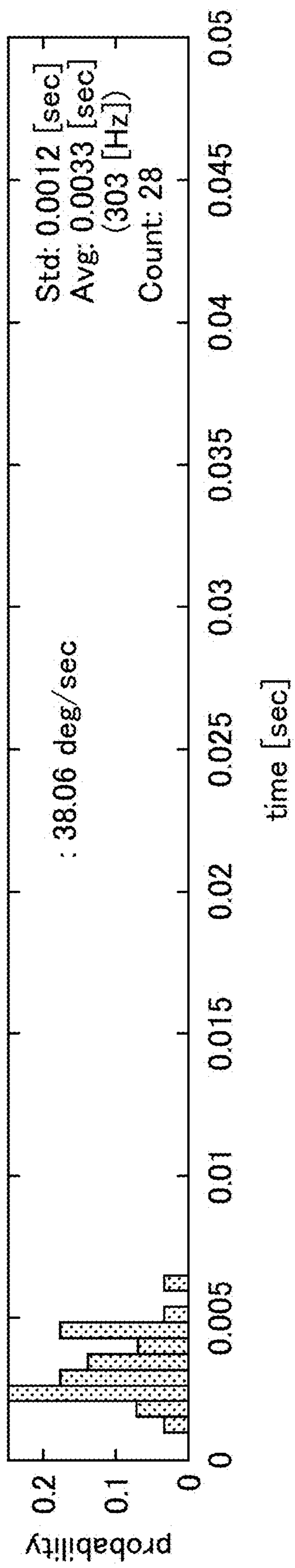
FIG. 5C is a histogram showing an example distribution of rates of vibration's acceleration.

FIG. 5C is a histogram showing an example distribution of rates of vibration's acceleration. FIG. 5C shows a distribution of peak values of vibration's acceleration obtained from a part of the vibration acceleration evaluation period shown in FIG. 3. Referring to the horizontal axis in FIG. 5C, the beginning of a part taken from the evaluation period is labeled "0" [sec].

FIG. 5C makes it clear that the acceleration of vibration have varying peak values. In other words, it is confirmed that vibration's acceleration is random in that it changes over time.

Figure 6:
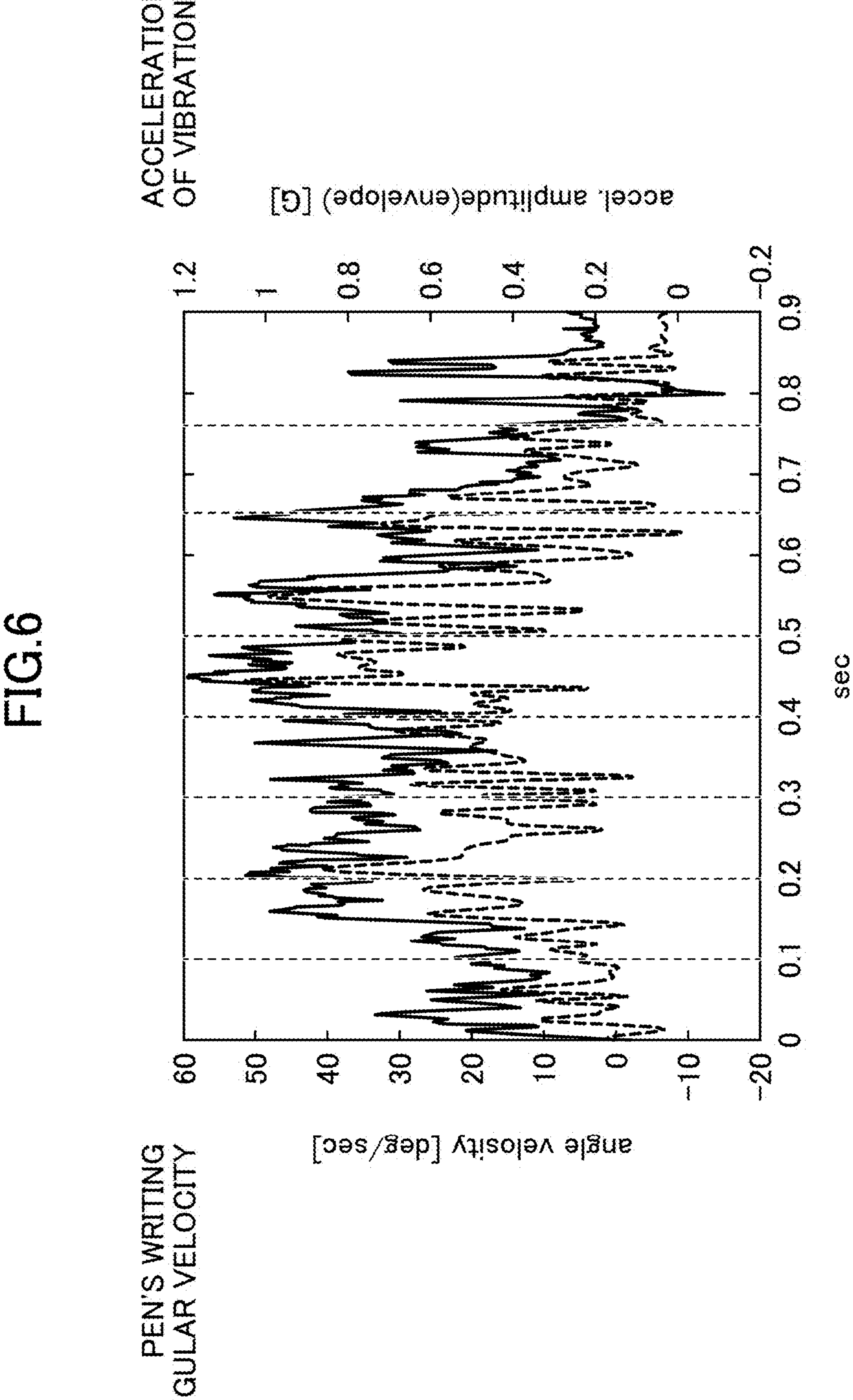
FIG. 6 is a diagram showing examples of how the pen's writing angular velocity and the rate of acceleration of vibration change over time.

FIG. 6 is a diagram showing an example in which the pen's writing angular velocity and the rate of acceleration of vibration change over time. The changes in the pen's writing angular velocity and vibration's acceleration over time shown in FIG. 6 are calculated from the vibration's acceleration and pen's angular velocity shown in FIG. 3.

As shown in FIG. 6, the waveform of the pen's writing angular velocity and the waveform of vibration's acceleration are substantially the same, making it clear that vibration's acceleration increases as the pen's writing angular velocity increases. Furthermore, vibration's acceleration increases as the pen's writing pressure becomes stronger, making it clear that vibration's acceleration increases as the pen's writing angular velocity and writing pressure increase. Accordingly, the drive signal has only to be generated such that vibration's acceleration increases as the pen's writing angular velocity and writing pressure increase, without changing the waveform of pulses in the time domain.

<Inner Structure of Stylus Pen 100>

Figure 7:
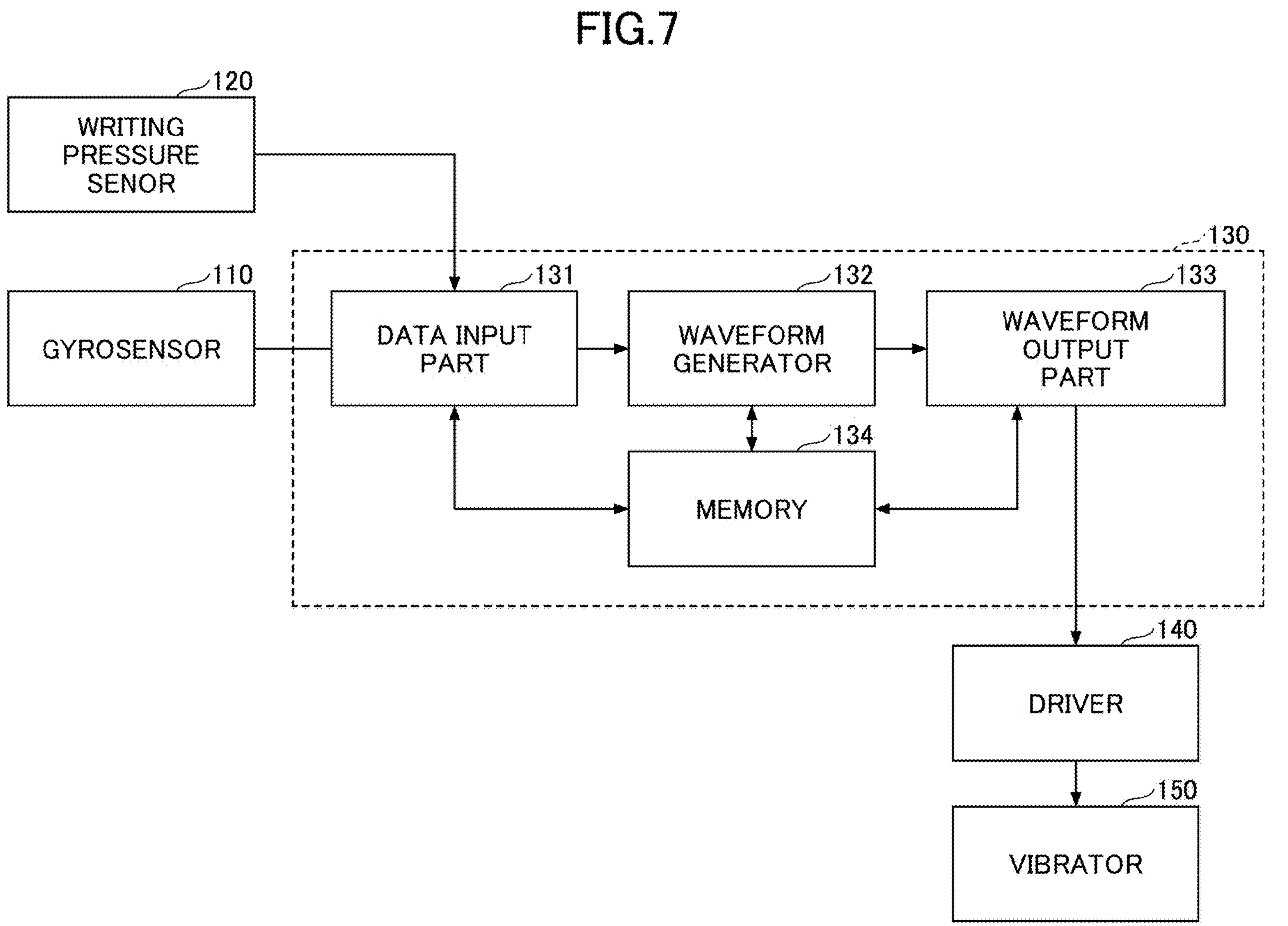
FIG. 7 is a block diagram showing an inner structure of a stylus pen according to an embodiment of the present disclosure.

FIG. 7 is a block diagram showing an inner structure of the stylus pen 100. The stylus pen 100 includes a gyrosensor 110, a writing-pressure sensor 120, a controller 130, a driver 140, and a vibrator 150. These are housed inside the pen part 100A. The gyrosensor 110 is an example of a speed detector. The writing-pressure sensor 20 is an example of a pen-pressure detector.

The gyrosensor 110 detects the angular velocity that is produced when writing with the stylus pen 100. The gyrosensor 110 detects the angular velocity while writing with the stylus pen 100 is in progress (also referred to as "writing angular velocity"). The gyrosensor 110 is connected to the controller 130 and outputs the pen's writing angular velocity to the controller 130. Furthermore, in addition to the pen's writing angular velocity, the gyrosensor 110 may detect the three-dimensional posture of the stylus pen 100 and output it to the controller 130.

The gyrosensor 110 may be located inside the pen part 100A, either near the tip 100A1, near the cap 100A2, or between the tip 100A1 and the cap 100A2. This is because the angular velocity that is produced in the pen part 100A while writing is in progress is the same in all parts of the pen part 100A.

The writing-pressure sensor 120 detects the force with which the user holding the stylus pen 100 with his/her fingers F presses the stylus pen 100 against the sheet 2. The writing-pressure sensor 120 is connected to the controller 130 and outputs the pen's writing pressure to the controller 130. For example, the writing-pressure sensor 120 may be located near the tip 100A1 of the pen part 100A and sandwiched between the tip 100A1 and the internal structure of the pen part 100A. It suffices if the writing-pressure sensor 120 can detect the pressure that acts on the pen's tip (the pen's writing pressure).

The controller 130 includes a data input part 131, a waveform generator 132, a drive signal generator 133, and a memory 134. The controller 130 is, for example, formed with a micro controller unit (MCU). The controller 130 is a computer including a central processing unit (CPU), a random access memory (RAM), a read-only memory (ROM), an input/output interface, and an internal bus. The data input part 131, the waveform generator 132, and the drive signal generator 133 are functional blocks that implement the functions of programs executed by the controller 130. The memory 134 is a functional representation of the memory of the controller 130. The controller 130 is not limited to a computer, and may be formed with, for example, a field programmable gate array (FPGA). An FPGA may be incorporated in a part of the controller 130 (for example, the drive signal generator 133).

The data input part 131 receives the pen's writing angular velocity and three-dimensional posture as inputs from the gyrosensor 110 as well as the pen's writing pressure from the writing-pressure sensor 120. The data input part 131 also integrates the pen's writing angular velocity received as an input from the gyrosensor 110 and calculates the pen's writing distance. The data input part 131 outputs the pen's writing angular velocity, writing distance, writing pressure, and three-dimensional posture, to the waveform generator 132. The unit of measurement for the writing distance is degrees. The writing distance refers to the distance over which something is written or drawn with the stylus pen 100, expressed in degrees.

The waveform generator 132 generates a pulse wave height (acceleration of vibration) and a pulse interval for generating a drive signal based on the pen's writing angular velocity and writing pressure received as inputs from the data input part 131, generates the drive signal by changing the pulses that are set in advance depending on the writing instrument used, to pulses that match the generated pulse wave height and pulse interval, or by changing the time intervals at which pulses occur, and outputs the thus-generated drive signal to the drive signal generator 133. The waveform of pulses set in advance in the time domain depending on the writing instrument used, the pulse wave height (magnitude of acceleration), and the pulse interval provide data that serves as the basis of the drive signal's waveform.

To be more specific, the waveform generator 132 multiplies the pen's writing angular velocity and a normal random number together, and multiplies the resulting value by the pen's writing pressure, thereby determining the pulse wave height (acceleration of vibration). The pulse wave height is generated such that the greater the pen's writing angular velocity, the higher the pulse wave height (acceleration of vibration), and the higher the pen's writing pressure, the higher the pulse wave height. Note that random numbers other than normal random numbers may be used.

In addition, the waveform generator 132 generates the interval between pulses (frequency) based on the value obtained by multiplying the pen's writing angular velocity and a normal random number together. The waveform generator 132 generates the interval between pulses (frequency) such that pulses occur at shorter intervals as the pen's writing angular velocity increases. By this means, vibrations occur at timings in accordance with the normal random number. Note that random numbers other than normal random numbers may also be used.

The waveform generator 132 may also correct the pen's writing pressure based on the pen's three-dimensional posture. The waveform generator 132 may also determine the interval of pulses from the previous waveform output request up to the next waveform output request, as the time elapsed, from the pen's writing speed and normal random number used at present. Using the writing position at which the previous waveform output request was sent and the pulse interval determined from the pen's writing speed and normal random number used at present, the waveform generator 132 may calculate the required writing distance by multiplying the pulse interval by the pen's writing speed at present, and use the result in making decisions.

The drive signal that matches the pulse wave height and pulse interval (frequency) generated thus is output from the waveform generator 132 to the drive signal generator 133.

The drive signal generator 133 is implemented, for example, using a finite impulse response (FIR) filter or an infinite impulse response (IIR) filter. When the drive signal generator 133 receives as an input the drive signal that matches the pulse wave height and pulse interval (frequency) from the waveform generator 132, the drive signal generator 133 generates the drive signal by weighting and superimposing the currently input signal (current sample signal) over past sample signals (from the previous sample signal to the N-th past sample signal, where N is an integer of 2 or more), and outputs the thus-generated drive signal to the driver 140. The drive signal is one in which the wave height of pulses (acceleration of vibration) and the interval of pulses (frequency) change on a random basis.

The memory 134 stores the programs and data that the waveform generator 132 and the drive signal generator 133 use to perform processes. As for the data, the memory 134 stores, for example, data that represents the normal random numbers that the waveform generator 132 uses, data that represents the relationship between the pen's writing angular velocity and the rate of acceleration of vibration, data that represents the relationship between the pen's writing pressure and the rate of acceleration of vibration, data that represents the relationship between the pen's writing angular velocity and the interval of occurrences (frequency), and so forth.

The driver 140 is a drive circuit for the vibrator 150, and drives the vibrator 150 based on the drive signal input from the drive signal generator 133.

For example, a vibration actuator such as a linear resonant actuator (LRA) can be used for the vibrator 150. The vibrator 150, placed inside the pen part 100A and driven by the drive signal, causes the pen part 100A to vibrate. As a result of this, the pen part 100A vibrates based on impulse responses, thereby providing vibrations that feel like really writing with the ballpoint pen 10.

An example has been illustrated in the above description in which the stylus pen 100 includes a controller 130 and a vibrator 150. Nevertheless, it is equally possible to include at least one of a controller 130 and a vibrator 150 in the tablet computer 200, and, provided that the pen's writing speed can be determined based on how the position on the operation surface 200A where the user operates the tablet computer 200 using the stylus pen 100 changes over time, drive the vibrator 150 based the pen's writing speed and writing pressure, thus causing the operation surface 200A to vibrate.

In such a case, a system including the stylus pen 100 and the tablet computer 200 can be regarded as one input system. In this input system, the tablet computer 200 is an example of a detector. An electrostatic sensor in the tablet computer 200 may be used to detect the positions where the user performs operations with the stylus pen 100. The electrostatic sensor can detect the coordinates of such operation positions on the operation surface 200A. In addition, in one example, a sensor that can detect the operational load that acts on the operation surface 200A may be provided in the tablet computer 200 and used to detect the pen's writing pressure. In this case, the stylus pen 100 may be equipped with a gyrosensor 110 and a writing-pressure sensor 120, and the pen's writing angular velocity and writing pressure may be sent to the controller 130 of the tablet computer 200 through wired communication or wireless communication between the stylus pen 100 and the tablet computer 200.

Furthermore, in this input system, the stylus pen 100 may include a controller 130 and the tablet computer 200 may include a vibrator 150, providing a structure in which the controller 130 of the tablet computer 200 generates the drive signal and sends it to the stylus pen 100 through wired communication or wireless communication between the stylus pen 100 and the tablet computer 200, thus driving the vibrator 150. In this case, either the stylus pen 100 or the tablet computer 200 may detect the pen's writing angular velocity and writing pressure.

<Advantages>

According to the present disclosure, a stylus pen 100 includes: a pen part 100A; a vibrator 150 provided in the pen part 100A; and a controller 130 configured to generate a drive signal for driving the vibrator 150. The controller 130 generates the drive signal such that the vibrator 150, when driven by the drive signal, causes the pen part 100A to vibrate based on an impulse response of a spring-mass-damper system. When something is written or drawn on a sheet of paper 2 with a pen such as a ballpoint pen 10, the vibrations produced in the pen then can be represented by impulse responses in a spring-mass-damper system. By thus causing the pen part 100A to vibrate based on an impulse response of a spring-mass-damper system, it is possible to provide a realistic tactile experience that feels as if really writing with the ballpoint pen 10.

Therefore, it is possible to provide a stylus pen 100 that can provide a realistic tactile experience of writing.

In addition to the foregoing, the stylus pen 100 may further include a gyrosensor 110 that is configured to detect the writing speed of the pen part 100A, and the controller 130 may generate the drive signal such that the pen part 100A vibrates at shorter intervals when the writing speed of the pen part 100A detected by the gyrosensor 110 (speed detector) increases. Consequently, the pen part 100A vibrates at varying timings depending on the writing speed of the pen part 100A, thus replicating changes in the timing to have the tactile experience of writing depending on the writing speed of the pen part 100A.

In addition to the foregoing, the controller 130 may generate the drive signal such that the pen part 100A vibrates at timings in accordance with a normal random number. Consequently, it is possible to provide a stylus pen 100 that can produce vibrations that change randomly over time, and that can therefore provide a more realistic tactile experience of writing.

In addition to the foregoing, the stylus pen 100 may further include a gyrosensor 110 (speed detector) that is configured to detect the writing speed of the pen part 100A. The controller 130 may generate the drive signal such that the pen part 100A vibrates at a higher rate of acceleration when the gyrosensor 110 detects a higher writing speed of the pen part 100A. Consequently, the pen part 100A vibrates at varying rates of acceleration depending on the writing speed of the pen part 100A, thus replicating changes in the power of the tactile experience of writing depending on the writing speed of the pen part 100A.

In addition to the foregoing, the stylus pen 100 may further include a writing-pressure sensor 120 configured to detect the pressure that acts on the pen part 100A. The controller 130 may generate the drive signal such that the pen part 100A vibrates at a higher rate of acceleration when the writing-pressure sensor 120 (pen-pressure detector) detects a higher writing pressure. Consequently, the pen part 100A vibrates at varying rates of acceleration depending on the writing speed of the pen part 100A, thus replicating changes in the power of the tactile experience of writing depending on the writing pressure of the pen part 100A.

Furthermore, since an internal model for achieving impulse responses of a spring-mass-damper system is one that is designed based on model estimation using an auto regressive model or an auto regressive moving average model, so that it is possible to replicate a realistic tactile experience that feels as if really writing with the ballpoint pen 10. Consequently, the present disclosure can provide a stylus pen 100 that allows the user to have a more realistic tactile experience of writing.

In addition, the resonant frequency of the vibrator 150 is 200 Hz or less. By allowing the pen part 100A to vibrate at such frequencies that the sensory organs on the human skin can sense the vibrations easily, it is possible to replicate a realistic tactile experience that feels as if really writing on the sheet 2 with the ballpoint pen 10. Consequently, the present disclosure can provide a stylus pen 100 that allows the user to have a more realistic tactile experience of writing.

Furthermore, according to the present disclosure, an input system includes: a stylus pen 100; a detector configured to detect contact of the stylus pen 100 with an operation surface; a vibrator 150; and a controller 130 configured to generate a drive signal for driving the vibrator 150. The controller 130 generates the drive signal such that the vibrator 150, when driven by the drive signal, causes the pen part 100A to vibrate based on an impulse response of a spring-mass-damper system. When something is written or drawn on a sheet of paper 2 with a pen such as a ballpoint pen 10, the vibrations produced in the pen then can be represented by impulse responses in a spring-mass-damper system. By thus causing the pen part 100A to vibrate based on an impulse response of a spring-mass-damper system, it is possible to provide a realistic tactile experience that feels as if really writing with the ballpoint pen 10.

It is therefore possible to provide an input system that allows the user to have a more realistic tactile experience of writing.

Although a stylus pen and an input system according to an embodiment of the present disclosure have been described above, the present disclosure is by no means limited to this embodiment, and various modifications and changes can be made without departing from the scope of the accompanying claims.

What is claimed is:

1. A stylus pen comprising:

a pen part;

a vibrator provided in the pen part; and a controller including a central processing unit and a memory, the controller being configured to generate a drive signal for driving the vibrator, wherein the controller is configured to generate the drive signal by applying an internal model such that the vibrator, when driven by the drive signal, causes the pen part to vibrate based on an impulse response of a spring-mass-damper system, wherein the internal model is generated through model estimation that fits an input-output relationship between a force acting on a writing instrument and an acceleration of the writing instrument produced thereby, to the spring-mass-damper system.

2. The stylus pen according to claim 1, further comprising a gyrosensor configured to detect a writing speed of the pen part, wherein the controller is configured to generate the drive signal such that the pen part vibrates at shorter intervals when the gyrosensor detects a higher writing speed of the pen part.

3. The stylus pen according to claim 1, wherein the controller is configured to generate the drive signal such that the pen part vibrates at timings determined by a normal random number.

4. The stylus pen according to claim 1, further comprising a gyrosensor configured to detect a writing speed of the pen part, wherein the controller is configured to generate the drive signal such that the pen part vibrates at a higher rate of acceleration when the gyrosensor detects a higher writing speed of the pen part.

5. The stylus pen according to claim 1, further comprising a writing pressure sensor configured to detect a writing pressure that acts on the pen part, wherein the controller is configured to generate the drive signal such that the pen part vibrates at a higher rate of acceleration when the writing pressure sensor detects a higher writing pressure.

6. A stylus pen comprising:

a pen part;

a vibrator provided in the pen part; and a controller including a central processing unit and a memory, the controller being configured to generate a drive signal for driving the vibrator, wherein the controller is configured to generate the drive signal such that the vibrator, when driven by the drive signal, causes the pen part to vibrate based on an impulse response of a spring-mass-damper system, wherein the impulse response is provided based on model estimation using an auto regressive model or an auto regressive moving average model.

7. A stylus pen comprising:

a pen part;

a vibrator provided in the pen part; and a controller including a central processing unit and a memory, the controller being configured to generate a drive signal for driving the vibrator, wherein the controller is configured to generate the drive signal such that the vibrator, when driven by the drive signal, causes the pen part to vibrate based on an impulse response of a spring-mass-damper system, wherein a resonant frequency of the vibrator is 200 Hz or less.

8. The stylus pen according to claim 6, further comprising a gyrosensor configured to detect a writing speed of the pen part, wherein the controller is configured to generate the drive signal such that the pen part vibrates at shorter intervals when the gyrosensor detects a higher writing speed of the pen part.

9. The stylus pen according to claim 6, wherein the controller is configured to generate the drive signal such that the pen part vibrates at timings determined by a normal random number.

10. The stylus pen according to claim 6, further comprising a gyrosensor configured to detect a writing speed of the pen part, wherein the controller is configured to generate the drive signal such that the pen part vibrates at a higher rate of acceleration when the gyrosensor detects a higher writing speed of the pen part.

11. The stylus pen according to claim 6, further comprising a writing pressure sensor configured to detect a writing pressure that acts on the pen part, wherein the controller is configured to generate the drive signal such that pen part vibrates at a higher rate of acceleration when the writing pressure sensor detects a higher writing pressure.

12. The stylus pen according to claim 7, further comprising a gyrosensor configured to detect a writing speed of the pen part, wherein the controller is configured to generate the drive signal such that the pen part vibrates at shorter intervals when the gyrosensor detects a higher writing speed of the pen part.

13. The stylus pen according to claim 7, wherein the controller is configured to generate the drive signal such that the pen part vibrates at timings determined by a normal random number.

14. The stylus pen according to claim 7, further comprising a gyrosensor configured to detect a writing speed of the pen part, wherein the controller is configured to generate the drive signal such that the pen part vibrates at a higher rate of acceleration when the gyrosensor detects a higher writing speed of the pen part.

15. The stylus pen according to claim 7, further comprising a writing pressure sensor configured to detect a writing pressure that acts on the pen part, wherein the controller is configured to generate the drive signal such that pen part vibrates at a higher rate of acceleration when the writing pressure sensor detects a higher writing pressure.

* * * * *